(12) United States Patent
Ishihara et al.

(10) Patent No.: US 10,670,481 B2
(45) Date of Patent: Jun. 2, 2020

(54) CAPACITIVE PRESSURE SENSOR

(71) Applicant: AZBIL CORPORATION, Chiyoda-ku (JP)

(72) Inventors: Takuya Ishihara, Chiyoda-ku (JP);
Masaru Soeda, Chiyoda-ku (JP);
Masashi Sekine, Chiyoda-ku (JP)

(73) Assignee: AZBILL CORPORATION, Chiyoda-ku (JP)

( * ) Notice: Subject to any disclaimer, the term of this patent is extended or adjusted under 35 U.S.C. 154(b) by 190 days.

(21) Appl. No.: 15/896,139

(22) Filed: Feb. 14, 2018

(65) Prior Publication Data

US 2018/0238756 A1 Aug. 23, 2018

(30) Foreign Application Priority Data

Feb. 17, 2017 (JP) ................................ 2017-027959

(51) Int. Cl.
*G01L 9/00* (2006.01)
*G01L 19/06* (2006.01)
(Continued)

(52) U.S. Cl.
CPC .......... *G01L 9/0072* (2013.01); *G01L 9/0042* (2013.01); *G01L 13/025* (2013.01);
(Continued)

(58) Field of Classification Search
CPC ...... G01L 19/04; G01L 9/0072; G01L 9/0042
See application file for complete search history.

(56) References Cited

U.S. PATENT DOCUMENTS

2012/0017691 A1* 1/2012 Ishihara ................ G01L 9/0042
73/724
2012/0206147 A1* 8/2012 Sim .......................... G01K 7/34
324/457
(Continued)

FOREIGN PATENT DOCUMENTS

JP 2002-111011 4/2002
JP 2006003234 A * 1/2006 ........... G01L 9/0073
(Continued)

OTHER PUBLICATIONS

Combined Chinese Office Action and Search Report dated Oct. 28, 2019 in corresponding Chinese Patent Application No. 201810150370.1 (with English Translation of Category of Cited Documents), 10 pages.

*Primary Examiner* — Jamel E Williams
(74) *Attorney, Agent, or Firm* — Oblon, McClelland, Maier & Neustadt, L.L.P.

(57) ABSTRACT

A pressure introducing chamber is provided with a baffle plate which is positioned with one surface thereof facing in a direction orthogonal to a direction of travel of a measured medium introduced through a pressure introducing hole into the pressure introducing chamber. A first distance between a pressure receiving surface of a sensor diaphragm and an inner surface of the pressure introducing chamber facing the pressure receiving surface and a second distance between the pressure receiving surface of the sensor diaphragm and the other surface of the baffle plate facing the pressure receiving surface are both smaller than a mean free path of the measured medium in the entire region of the pressure receiving surface of the sensor diaphragm.

10 Claims, 9 Drawing Sheets

(51) Int. Cl.
*G01L 13/02* (2006.01)
*G01M 3/16* (2006.01)
*G01L 19/04* (2006.01)

(52) U.S. Cl.
CPC .......... *G01L 19/04* (2013.01); *G01L 19/0636* (2013.01); *G01M 3/16* (2013.01)

(56) References Cited

U.S. PATENT DOCUMENTS

| | | | |
|---|---|---|---|
| 2012/0247216 A1* | 10/2012 | Ishihara | G01L 9/0072 73/708 |
| 2014/0150559 A1* | 6/2014 | Ishihara | G01L 9/0075 73/718 |
| 2014/0182386 A1* | 7/2014 | Ishihara | G01L 19/0627 73/754 |
| 2015/0040674 A1* | 2/2015 | Ishihara | G01L 19/0636 73/724 |
| 2017/0248487 A1* | 8/2017 | Ishihara | C23C 16/45525 |
| 2018/0238756 A1* | 8/2018 | Ishihara | G01L 9/0072 |
| 2018/0238757 A1* | 8/2018 | Soeda | G01L 9/0072 |
| 2018/0259409 A1* | 9/2018 | Sekine | G01L 9/125 |
| 2019/0226936 A1* | 7/2019 | Ishihara | G01L 9/0075 |

FOREIGN PATENT DOCUMENTS

| | | | |
|---|---|---|---|
| JP | 2015-34786 | 2/2015 | |
| JP | 2015034786 A * | 2/2015 | .......... G01L 9/0072 |
| JP | 2015-184064 | 10/2015 | |
| TW | 201514459 A | 4/2015 | |

\* cited by examiner

L < λ

| PRESSURE [Pa] | TEMPERATURE [°C] | | | |
|---|---|---|---|---|
| | 50 | 100 | 150 | 200 |
| 1333.2 | 55 | 64 | 72 | 81 |
| 1000.0 | 73 | 85 | 96 | 107 |
| 266.6 | 275 | 318 | 360 | 403 |
| 133.3 | 550 | 635 | 720 | 805 |
| 100.0 | 733 | 847 | 960 | 1074 |
| 26.7 | 2750 | 3175 | 3601 | 4026 |
| 13.3 | 5499 | 6350 | 7201 | 8052 |
| 10.0 | 7332 | 8466 | 9601 | 10735 |

MEAN FREE PATH λ OF $N_2$ (in μm)

CAPACITIVE PRESSURE SENSOR

CROSS-REFERENCE TO RELATED APPLICATIONS

The present application is based on and claims priority to Japanese Application No. 2017-027959, filed Feb. 17, 2017, the entire contents of which are incorporated therein by reference.

BACKGROUND

1. Field

The present disclosure relates to a capacitive pressure sensor including a sensor chip having a diaphragm structure that detects a capacitance corresponding to pressure of a medium to be measured.

2. Description of the Related Art

In pressure sensors, including vacuum gauges which are used for example in semiconductor manufacturing facilities, a sensor element including a small diaphragm has been often adopted using a so-called micro-electromechanical systems (MEMS) technique. A main detection principle of this sensor element is that the pre sure of a pressure medium is received by the diaphragm and the resulting displacement of the diaphragm is converted into some type of signal.

For example, as a pressure sensor that uses a sensor element of this type, a capacitive pressure sensor is widely known. The capacitive pressure sensor is configured to detect, as a change in capacitance, the displacement of a diaphragm that flexes in response to pressure of a medium to be measured (hereinafter referred to as "measured medium"). Unlike Pirani gauges and ionization gauges, the capacitive pressure sensor is independent of the type of gas, resistant to corrosive process gases, capable of reducing adsorption of raw material gasses and accumulation of byproducts by heating the sensor element, and thus is often used, for example, in semiconductor facilities and various industrial applications. The diaphragm that flexes in response to pressure of the measured medium is called a pressure-sensitive diaphragm or sensor diaphragm.

For example, a capacitive pressure sensor that is configured and used to measure a vacuum in a manufacturing process in a semiconductor manufacturing apparatus is referred to as a diaphragm gauge. Examples of applications using the diaphragm gauge include film deposition which is performed by sputtering, chemical vapor deposition (CVD), or atomic layer deposition (ALD). The diaphragm gauge is also used in the process of etching, for example, silicon (Si) wafers.

In the film deposition or etching process, deposited films or byproducts produced during the process (hereinafter, these substances are referred to as "contaminants") accumulate more or less inside the chambers, pipes, and pumps and cause various problems. Accumulation of contaminants inside the diaphragm gauge that measures and controls gas pressure in the process is known to cause a shift in zero point, change sensitivity to pressure, and significantly affect the quality of film deposition or etching.

Aside from keeping the sensor element at high temperatures, some measures have been taken to prevent accumulation of contaminants inside the diaphragm gauge. For example, Japanese Unexamined Patent Application Publication No. 2015-34786 discloses a method in which a path through which a process gas travels to reach the surface of a sensor diaphragm is made complex so that a gas which tends to adhere is caught along the way as much as possible.

Also, Japanese Unexamined Patent Application Publication No. 2015-184064 discloses a method in which even when contaminants accumulate on a sensor diaphragm, the displacement of the diaphragm is reduced by controlling the position of the contaminants or modifying the structure of the diaphragm. Particularly for a film deposition technique using a surface reaction, such as ALD, a baffle structure is effective, which causes gas molecules to more frequently collide with the wall of a gas introduction path of a diaphragm gauge.

However, typical CVD is plot necessarily performed under the same conditions as ALD for the diaphragm gauge. In particular, because of recent miniaturization of semiconductors, a process which involves etching in the middle of film deposition has begun to be performed, instead of a simple CVD process. In the new process, where etching is performed with an etching gas different from a gas for film deposition, re-adhesion (accumulation) of contaminants onto the sensor diaphragm associated with chemical reactions between different substances and the resulting reaction heat may cause the diaphragm gauge to malfunction. The diaphragm gauge needs to be resistant to such processes, and improvement is required.

This challenge will be specifically described with reference to FIG. 14. FIG. 14 illustrates a configuration of a main part of a diaphragm gauge according to the related art. A diaphragm gauge 100 (100A) includes a diaphragm unit including a diaphragm (sensor diaphragm) 101 displaced in response to pressure of a measured medium and a diaphragm support portion 102 configured to support a periphery of the sensor diaphragm 101, a sensor base 105 joined to one side of the diaphragm support portion 102 and configured to define a reference vacuum chamber 104 together with the sensor diaphragm 101, and a base plate 107 joined to the other side of the diaphragm support portion 102 opposite the Sensor base 105 and configured to define a pressure introducing chamber 106 together with the sensor diaphragm 101.

In the diaphragm gauge 100A, a fixed electrode 108 is formed on a surface of the sensor base 105 adjacent to the reference vacuum chamber 104, and a movable electrode 109 is formed on a surface of the sensor diaphragm 101 adjacent to the reference vacuum chamber 104 in such a manner as to face the fixed electrode 108. The base plate 107 has a pressure introducing hole 107a in the center thereof (corresponding to the center of the sensor diaphragm 101). In the diaphragm gauge 100A, the measured medium is introduced through the pressure introducing hole 107a into the pressure introducing chamber 106 and causes the sensor diaphragm 101 to flex.

In the diaphragm gauge 100A, where the pressure introducing hole 107a is formed in the center of the base plate 107, a contaminant accumulates on a pressure receiving surface 101a of the sensor diaphragm 101 located directly below the pressure introducing hole 107a. That is, in the case of a gas phase reaction chemical reaction caused by collisions between molecules in the space), as illustrated in FIG. 15, a contaminant 110 accumulates in the center of the sensor diaphragm 101 as different substances chemically react with each other. This is because, as described below, a flow of the measured medium in the space above the pressure receiving surface 101a of the sensor diaphragm 101 facing the pressure introducing hole 107a not a molecular flow. Thus, in the diaphragm gauge 100A having this structure, the accumulation of the contaminant 110 in the center of the sensor diaphragm 101 causes a significant shift in zero point.

In a diaphragm gauge 100 (100B) illustrated in FIG. 16, the base plate 107 has, for example, four pressure introducing holes 107a outside the center thereof (corresponding to the center of the sensor diaphragm 101). That is, the base plate 107 has the four pressure introducing holes 107a in or around the area between a pressure sensitive capacitance and a reference capacitance. The four pressure introducing holes 107a are circumferentially evenly spaced apart from one another. As illustrated in FIG. 17, in the case of a gas phase reaction a chemical reaction between different substances causes the contaminant 110 to accumulate on the pressure receiving surface 101a of the sensor diaphragm 101 located directly below the pressure introducing holes 107a circumferentially evenly spaced apart from one another. Again, this is because the flow of the measured medium in the space above the pressure receiving surface 101a of the sensor diaphragm 101 facing the pressure introducing holes 107a is not a molecular flow. Displacement of the sensor diaphragm 101 caused by accumulation of the contaminant 110 is reduced in this case, but the accumulation of the contaminant 110 still causes a shift in zero point.

SUMMARY

The present disclosure has been made to solve the problems described above. An object of the present disclosure is to provide a capacitive pressure sensor that reduces problems associated with accumulation of contaminants specific to CVD processes.

To achieve the object described above, the present disclosure provides a capacitive pressure sensor that includes a diaphragm unit (33) including a diaphragm (31) displaced in response to pressure of a measured medium and a diaphragm support portion (32) configured to support a periphery of the diaphragm, a sensor base (35) joined to one side of the diaphragm support portion and configured to define a reference vacuum chamber (34) together with the diaphragm, a base plate (22) joined to the other side of the diaphragm support portion opposite the sensor base and configured to define a pressure introducing chamber (36) together with the diaphragm, a fixed electrode (37) formed on a surface of the sensor base adjacent to the reference vacuum chamber, and a movable electrode (38) formed on a surface of the diaphragm adjacent to the reference vacuum chamber in such a manner as to face the fixed electrode. The base plate has a pressure introducing hole (22a) for introducing the measured medium into the pressure introducing chamber. The pressure introducing chamber is configured in such a manner that a distance (L) between a pressure receiving surface (31a) of the diaphragm and a surface (36a, 39b) facing the pressure receiving surface is smaller than a mean free path ($\lambda$) of the measured medium in substantially the entire region of the pressure receiving surface.

In the present disclosure, the pressure introducing chamber is configured in such a manner that the distance (L) between the pressure receiving surface of the diaphragm and the surface facing the pressure receiving surface is smaller than the mean free path ($\lambda$: average distance traveled by a molecule between successive collisions) of the measured medium in substantially the entire region of the pressure receiving surface of the diaphragm (L<$\lambda$). Thus, in the present invention, in substantially the entire region of the pressure receiving surface of the diaphragm, the flow of the measured medium in a direction orthogonal to the pressure receiving surface is a molecular flow (i.e., flow in the free molecular region where the frequency of collisions of molecules with the wall is higher than the frequency of collisions between molecules), and collisions between molecules on the pressure receiving surface of the diaphragm are reduced. Therefore, in the case of a gas phase reaction, collisions between different substances are reduced, and this reduces accumulation of contaminants on the diaphragm.

In the foregoing explanation, elements shown in the drawings and corresponding to those of the invention are indicated, as examples, by reference numerals in parentheses.

As described above, in the present disclosure, the distance between the pressure receiving surface of the diaphragm and the surface facing the pressure receiving surface is smaller than the mean free path of the measured medium in substantially the entire region of the pressure receiving surface. Therefore, in substantially the entire region of the pressure receiving surface of the diaphragm, the flow of the measured medium in the direction orthogonal to the pressure receiving surface is a molecular flow, and collisions between molecules on the pressure receiving surface of the diaphragm are reduced. Thus, problems associated with accumulation of contaminants specific to CVD processes can be reduced.

DETAILED DESCRIPTION

Figure 1:
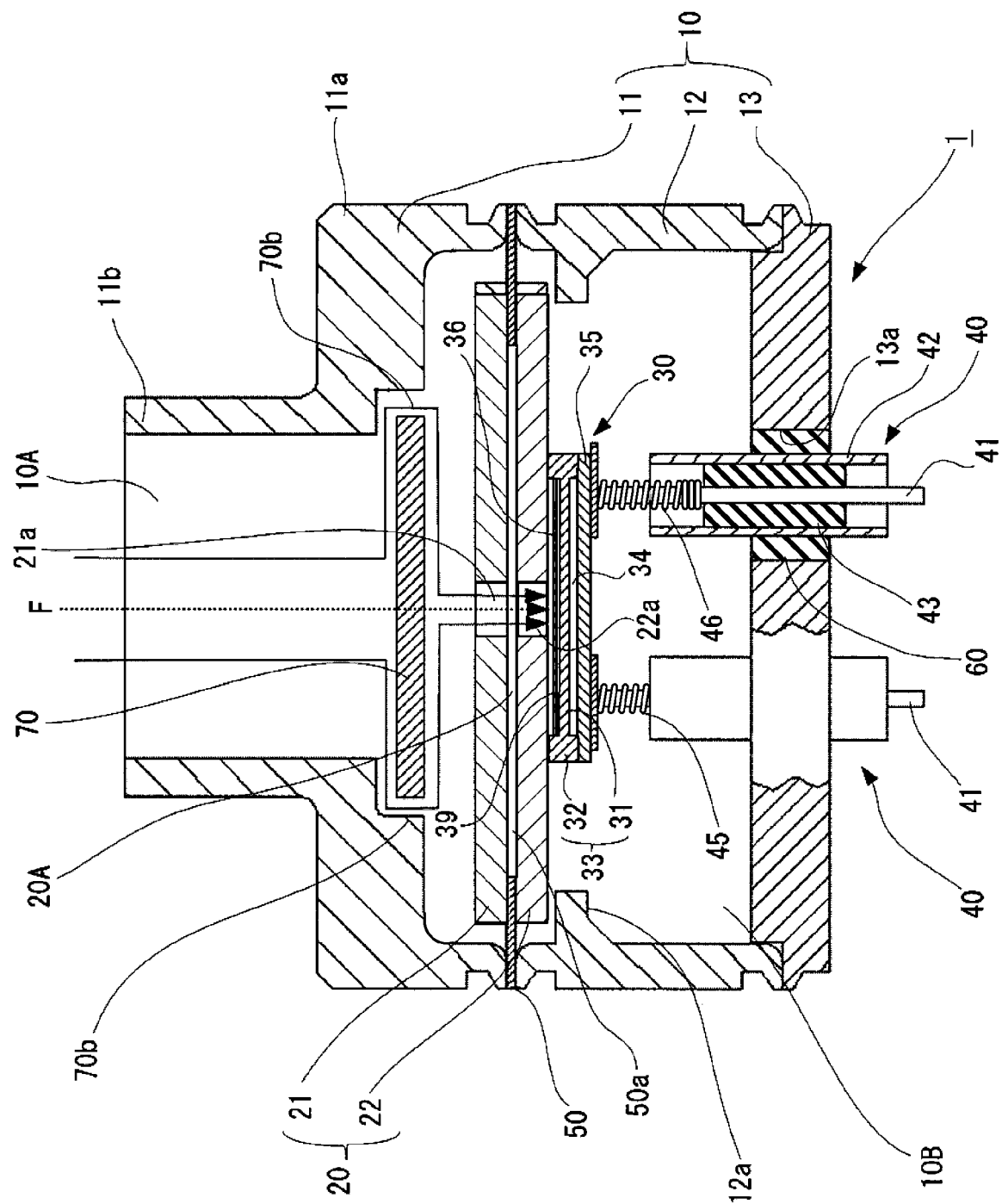
FIG. 1 is a vertical cross-sectional view of a main part of a diaphragm gauge which is an embodiment of a capacitive pressure sensor according to the present disclosure.

The present disclosure will now be described in detail on the basis of the drawings. Before description of embodiments, a principle of the present disclosure will be explained.

(Principle of the Present Disclosure)

Film formation using a CVD method is based on a gas phase reaction and a surface reaction. That is, in the gas phase in the vicinity of a substrate surface, raw material gases are thermally decomposed or chemically react with each other to form intermediate products. After the intermediate products travel to reach the substrate surface, a final reaction takes place and a film of the resulting end products is formed. Either the gas phase reaction or surface reaction serves as a dominant factor in film deposition, depending on the type of film to be produced, row material gas, gas activating method, or the like.

For example, in formation of a polysilicon (poly-Si) film by thermal CVD using monosilane ($SiH_4$), an active intermediate $SiH_2$ formed by $SiH_4 \rightarrow SiH_2 + H_2$ serves an important role in the vicinity of the substrate surface, and the film deposition proceeds through cyclic reactions in the following manner: $SiH_4 + SiH_2 \rightarrow Si_2H_6$, $Si_2H_6 + SiH_2 \rightarrow Si_3H_8$, and so on.

In the process of forming a silicon dioxide ($SiO_2$) film by a reaction between tetraethyl orthosilicate (TEOS) and ozone ($O_3$), siloxane polymer is known to be temporarily produced, in the gas phase and react with $O_3$ on the substrate surface to form an oxide film. That is, in CVD, a reaction in the gas phase often plays an important role in film formation.

On the other hand, ALD involves repeating a cycle of ideally alternately introducing a raw material gas and a reaction gas and causing them to chemically react with each other on the substrate surface. That is, ALD is a film deposition technique entirely based on the surface reaction. The present inventors have found out that this is the reason why measures that are effective for ALD using the surface reaction may not necessarily be effective for CVD. Then, as a result of studies, the present inventors have become focused on the fact that to avoid accumulation on the sensor diaphragm of the diaphragm gauge, it is very important to prevent the occurrence of chemical reactions in the gas phase and, for this, it is necessary to reduce collisions between molecules.

Specifically, as an effective measure, the present inventors have come up with an idea that when the "Characteristic length" of a space in contact with the sensor diaphragm on which accumulation is to be avoided is made smaller than the "mean free path average distance traveled by a molecule between successive collisions)" of a process gas, a fluid in the space above the sensor diaphragm can be brought closer to the "free molecular region (where the flow of gas is a molecular flow)" where the frequency of collisions of molecules with the wall is higher than the frequency of collisions between molecules. Note that the terms "mean free path", "molecular flow", and "characteristic length" are generally used as terms related to vacuum technology.

To avoid collisions between molecules anal reduce reactions in the gas phase as described above, the "characteristic length" of the space in contact with the sensor diaphragm needs to be less than or equal to the mean free path of the process gas. In the case of an ideal gas, the mean free path $\lambda$ is expressed as follows:

$$\lambda = kT/(2^{1/2}\pi p \delta^2)$$

where k is Boltzmann constant, T is absolute temperature, p is pressure, and $\delta$ is molecular diameter. For example, since nitrogen has a molecular diameter of about $3.7 \times 10^{-10}$ m, its mean free path at each temperature and pressure is as shown in FIG. 13.

Pressures used in CVD range from about 10 Pa to about 1333.2 Pa (10 Torr) and temperatures used in CVD range from 50° C. to 200° C. Therefore, when the "characteristic length" of the space in contact with the sensor diaphragm is set to 50 μm or less, gas molecules behave as free molecules in this space, and collisions with the wall become dominant over collisions between molecules.

Figures 12, 13:
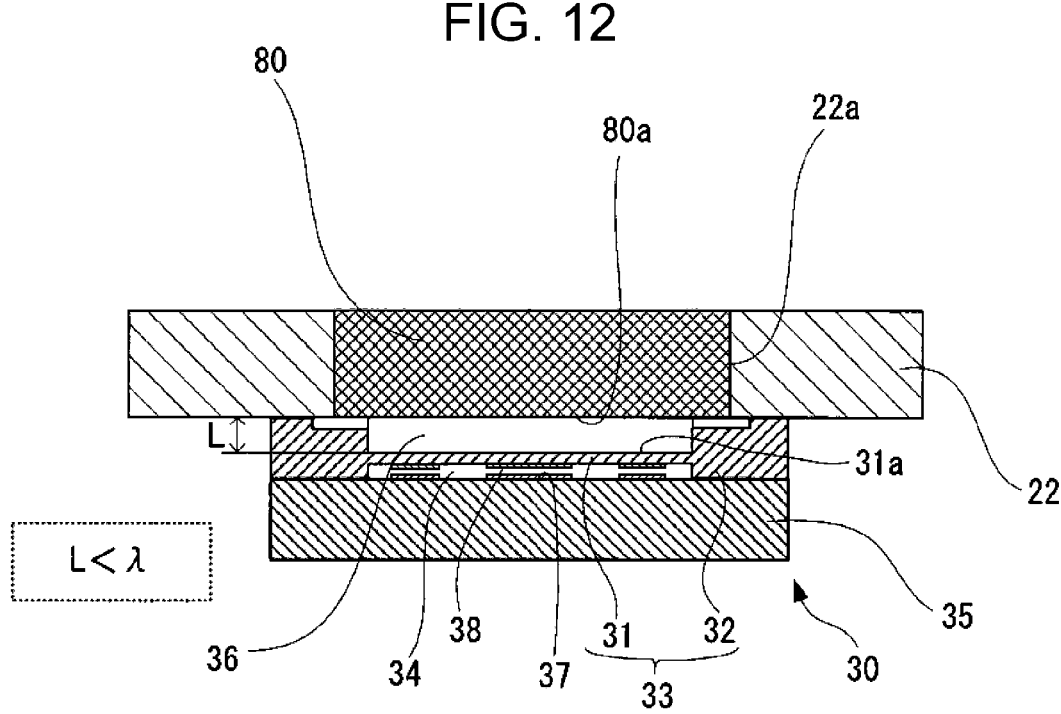
FIG. 12 illustrates a main part of a fifth embodiment.
FIG. 13 Shows a mean free path of nitrogen at each temperature and pressure.
Figure 14:
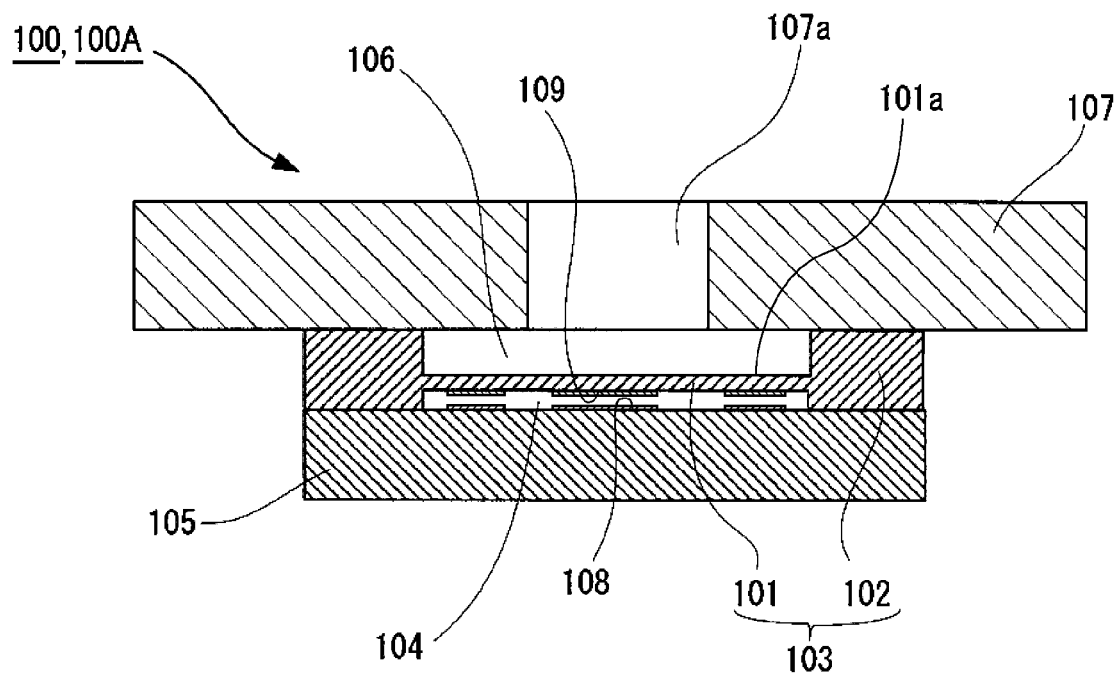
FIG. 14 illustrates a configuration of a main part of a diaphragm gauge according to the related art (in which a base plate has a pressure introducing hole in the center thereof)
Figure 15:
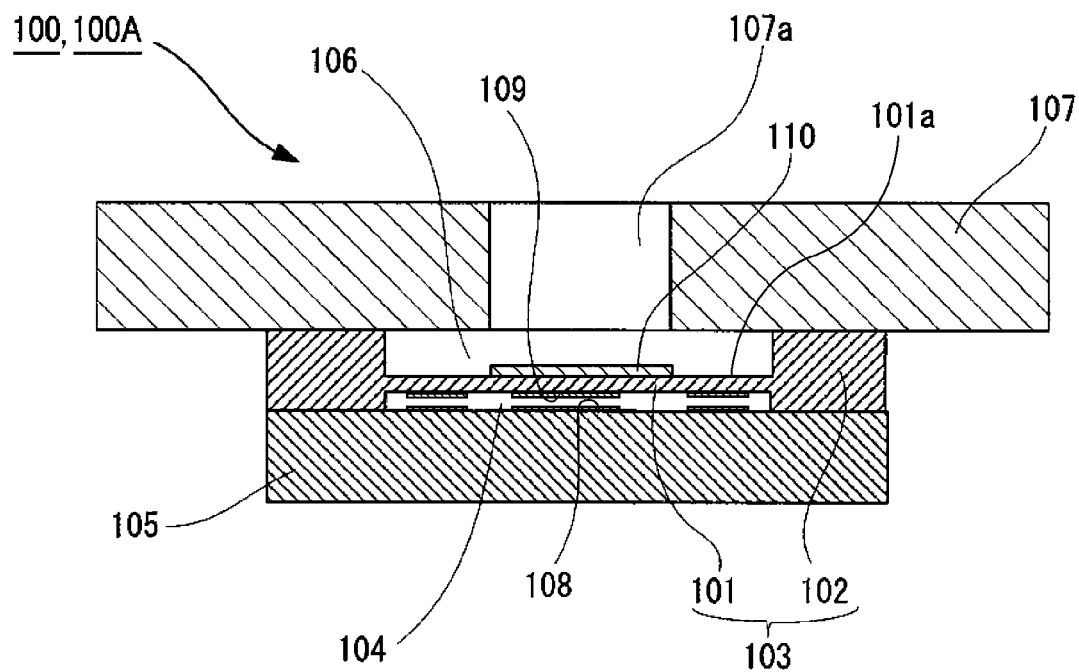
FIG. 15 illustrates a contaminant accumulating on a sensor diaphragm in the configuration illustrated in FIG. 14.
Figure 16:
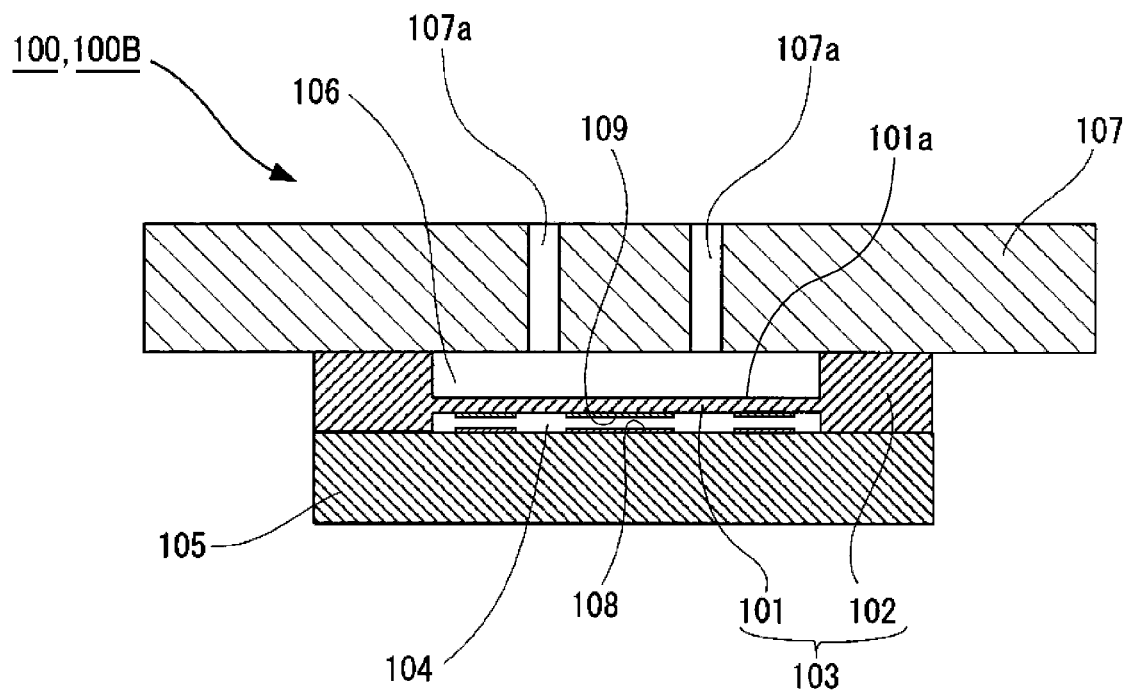
FIG. 16 illustrates a configuration of a main part of another diaphragm gauge according to the related art (in which the base plate has a plurality of pressure introducing holes outside the center thereof)
Figure 17:
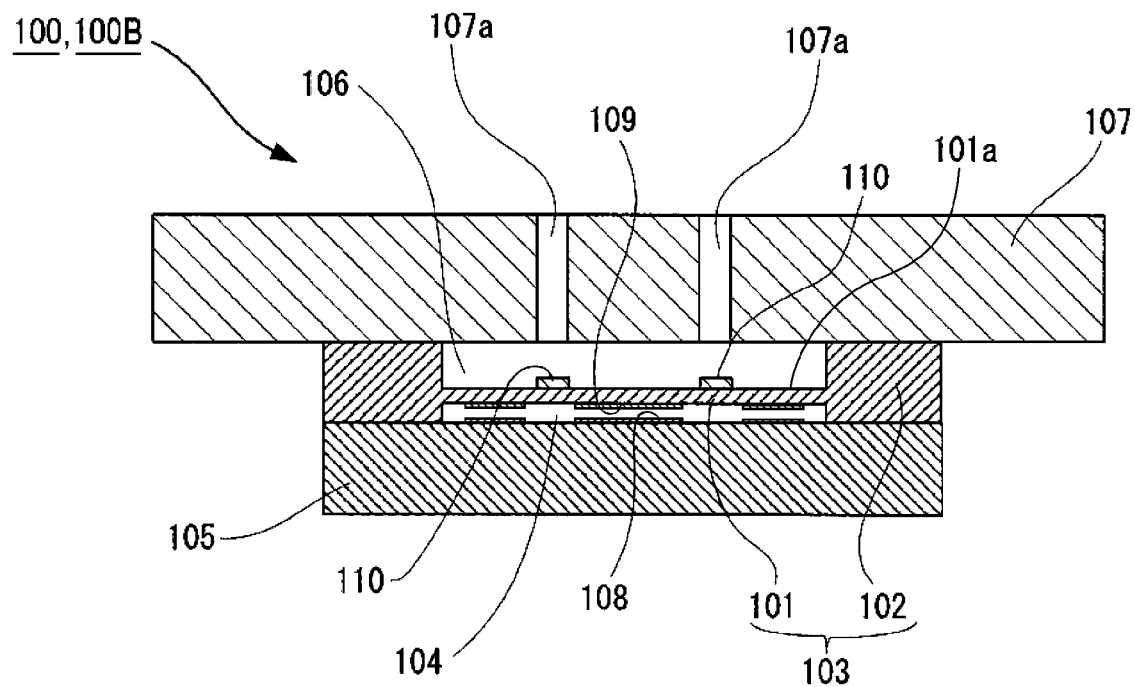
FIG. 17 illustrates a contaminant accumulating on the sensor diaphragm in the configuration illustrated in FIG. 16.

Like monosilane and TEOS, the gas used in the actual process has a molecular diameter basically structurally greater than nitrogen, and the mean free path of the gas is probably smaller than the values shown in FIG. 13. Therefore, the "characteristic length" of the space in contact with the sensor diaphragm needs to be at least 50 μm or less, but if this is too small, the sensor response may deteriorate because escape of the gas is blocked. Also, the presence of byproducts and foreign materials may interfere with the movement of the sensor diaphragm. Therefore, a space having a characteristic length of at least 10 μm is required.

(First Embodiment)

FIG. 1 is a vertical cross-sectional view of a main part of a diaphragm gauge which is an embodiment of a capacitive pressure sensor according to the present disclosure.

A diaphragm gauge 1 includes a package 10, a base plate assembly 20 contained in the package 10, a sensor chip 30 also contained in the package 10 and joined to the base plate assembly 20, and electrode lead portions 40 directly attached to the package 10 and configured to electrically connect the interior and exterior of the package 10. The base plate assembly 20 is composed of a first base plate 21 and a second base plate 22, spaced from the package 10, and supported by the package 10 with only a supporting diaphragm 50 therebetween.

The package 10 includes an upper housing 11, a lower housing 12, and a cover 13. The upper housing 11, the lower housing 12, and the cover 13 are made of metal resistant to corrosion and are joined to one another by welding.

The upper housing 11 is formed by connecting cylindrical bodes of different diameters. A large-diameter portion 11a of the upper housing 11 has a portion joined to the supporting diaphragm 50, and a small-diameter portion 11b of the upper housing 11 defines an introducing portion 10A into which a measured medium flows.

The lower housing 12 has a substantially cylindrical shape. An independent vacuum chamber 10B in the package 10 is formed by the lower housing 12, the cover 13, the supporting diaphragm 50, the base plate assembly 20, and the sensor chip 30. The vacuum chamber 10B contains a gas-absorbing material called getter (not shown) to maintain the degree of vacuum therein.

The lower housing 12 has stoppers 12a protruding on a side thereof adjacent to the supporting diaphragm 50 and arranged at appropriate locations in the circumferential direction. The stoppers 12a are configured to limit excessive displacement of the base plate assembly 20 caused by an abrupt increase in the pressure of the measured medium.

The cover 13 is a circular plate having electrode lead insertion holes 13a formed at predetermined locations therein. The electrode lead portions 40 are each embedded in the cover 13 at a corresponding one of the electrode lead insertion holes 13a, with a hermetic seal 60 between the cover 13 and the electrode lead portion 40. This ensures sealing between them.

The supporting diaphragm 50 is a thin metal sheet having an outer shape that conforms to the shape of the package 10. While being positioned between the first base plate 21 and the second base plate 22, the outer edge portion of the supporting diaphragm 50 is sandwiched between, and joined by welding or the like to, edge portions of the upper housing 11 and the lower housing 12.

The supporting diaphragm 50 is, for example, several tens of micrometers thick in the present embodiment and substantially thinner than the base plates 21 and 22. The supporting diaphragm 50 has, in the center thereof, a large-diameter hole 50a that forms a slit-like space (cavity) 20A between the first base plate 21 and the second base plate 22.

The base plates 21 and 22 are made of sapphire, which is a single-crystal body of aluminum oxide. The first base plate 21 is joined to the upper surface of the supporting diaphragm 50 while being spaced from the inner surface of the package 10, and the second base plate 22 is joined to the lower surface of the supporting diaphragm 50 while being spaced from the inner surface of the package 10.

The first base plate 21 has, in the center thereof, an introducing hole 21a for introducing the measured medium. The introducing hole 21a communicates with the slit-like space (cavity) 20A. The second base plate 22 has, in the center thereof, a discharging hole 22a for discharging the measured medium. The discharging hole 22a communicates with the slit-like space (cavity) 20A and a pressure introducing chamber 36 in the sensor chip 30. The discharging hole 22a corresponds to a pressure introducing hole formed in a base plate according to the present disclosure. The measured medium is introduced through the discharging hole 22a into the pressure introducing chamber 36 in the sensor chip 30. Hereinafter, the discharging hole 22a formed in the second base plate 22 may also be referred to as "pressure introducing hole 22a".

As described above, the base plates 21 and 22 are substantially greater in thickness than the supporting diaphragm 50. At the same time, the base plates 21 and 22 have a so-called sandwich structure in which the supporting diaphragm 50 is sandwiched between the base plates 21 and 22. This prevents warpage of this portion caused by thermal stress resulting from a difference in thermal expansion coefficient between the supporting diaphragm 50 and the base plate assembly 20.

The sensor chip 30 is made of sapphire, which is a single-crystal body of aluminum oxide, and is rectangular in shape as viewed from above. The sensor chip 30 is joined to the lower surface of the second base plate 22 with an aluminum-oxide-based bonding material interposed therebetween. The technique for joining the sensor chip 30 is not described here, as it is described in detail in Japanese Unexamined Patent Application Publication No. 2002-111011.

Figure 2:
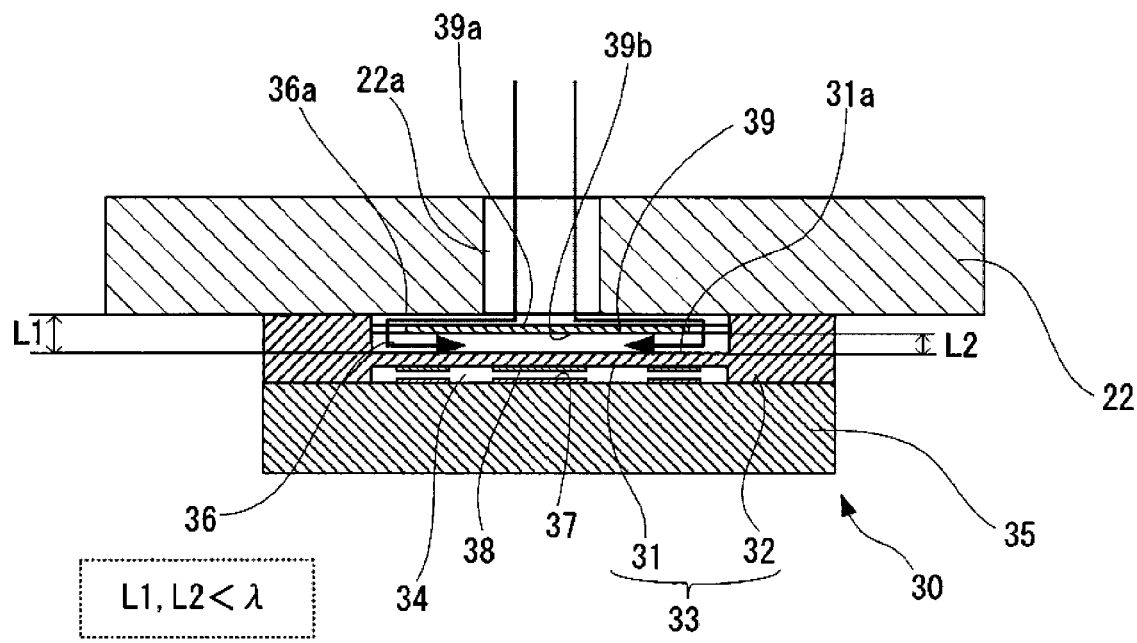
FIG. 2 illustrates a main part of a first embodiment, which is the diaphragm gauge illustrated in FIG. 1.

The sensor chip 30 measures 1 cm or less per side as viewed from above. As illustrated in FIG. 2, the sensor chip 30 includes a diaphragm unit 33 including a diaphragm (sensor diaphragm) 31 displaced in response to pressure of the measured medium and a diaphragm support portion 32 configured to support the periphery of the sensor diaphragm 31, and a sensor base 35 joined to the diaphragm support portion 32 and configured to define a reference vacuum chamber 34 together with the sensor diaphragm 31. The reference vacuum chamber 34 in the sensor chip 30 and the vacuum chamber 10B in the package 10 maintain the same degree of vacuum therein through a communication hole (not shown at an appropriate location in the sensor base 35.

In the sensor chip 30, the diaphragm support portion 32 opposite the sensor base 35 is joined to the second base plate 22. This forms the pressure introducing chamber 36 between the second base plate 22 and the sensor diaphragm 31. The pressure introducing chamber 36 is provided with a baffle plate 39 which is positioned, with one surface 39a thereof facing in a direction orthogonal to the direction of travel of the measured medium introduced through the pressure introducing hole 22a into the pressure introducing chamber 36.

In the pressure introducing chamber 36, a distance L1 between a pressure receiving surface 31a of the sensor diaphragm 31 and an inner surface 36a of the pressure introducing chamber 36 facing the pressure receiving surface 31a and a distance L2 between the pressure receiving surface 31a of the sensor diaphragm 31 and the other surface 39b of the baffle plate 39 facing the pressure receiving surface 31a are both smaller than a mean free path $\lambda$ of the measured medium (L1<$\lambda$, L2<$\lambda$) in the entire region of the pressure receiving surface 31a of the sensor diaphragm 31. Specifically, the distance L1 between the pressure receiving surface 31a of the sensor diaphragm 31 and the inner surface 36a of the pressure introducing chamber 36 ranges from 10 µm to 50 µm, and the distance L2 between the pressure receiving surface 31a of the sensor diaphragm 31 and the surface 39b of the baffle plate 39 ranges from 10 µm to 50 µm and Satisfies L2<L1.

The diaphragm unit 33 and the sensor base 35 are joined together by so-called direct bonding to form the integral sensor chip 30. Although the diaphragm unit 33 is formed by the sensor diaphragm 31 and the diaphragm support portion 32 configured as an integral component in the present embodiment, the sensor diaphragm 31 and the diaphragm support portion 32 may be configured as separate components. For example, the diaphragm support portion 32 may be divided into upper and lower parts, between which the sensor diaphragm 31 is sandwiched. In this case, a portion sandwiched between the upper and lower parts of the diaphragm support portion 32 serves as a component of the diaphragm support portion 32.

In the sensor chip 30, a fixed electrode 37 made of a conductor, such as gold or platinum, is formed on a surface of the sensor base 35 adjacent to the reference vacuum chamber 34, and a movable electrode 38 made of a conductor, such as gold or platinum, is formed on a surface of the sensor diaphragm 31 adjacent to the reference vacuum chamber 34 in such a manner as to face the fixed electrode 37.

The electrode lead portions 40 each include an electrode lead pin 41 and a metal shield 42. The electrode lead pin 41 is embedded at a center portion thereof in the metal shield 42 with a hermetic seal 43 made of an insulating material, such as glass. The electrode lead portion 40 thus maintains an airtight state between both end portions of the electrode lead pin 41.

The electrode lead pin 41 is exposed at one end thereof to the outside of the package 10, so as to transmit the output of the diaphragm gauge 1 to an external signal processing unit through a wire (not shown). The hermetic seal 60 is also interposed between each shield 42 and the cover 13. Contact springs 45 and 46 having conductivity are connected to the respective other ends of the electrode lead pins 41.

The contact springs 45 and 46 are flexible enough so that even if the supporting diaphragm 50 is slightly displaced by an abrupt pressure rise caused by sudden inflow of the measured medium from the introducing portion 10A, the biasing force of the contact springs 45 and 46 does not affect the measurement accuracy of the sensor chip 30.

Figure 3:
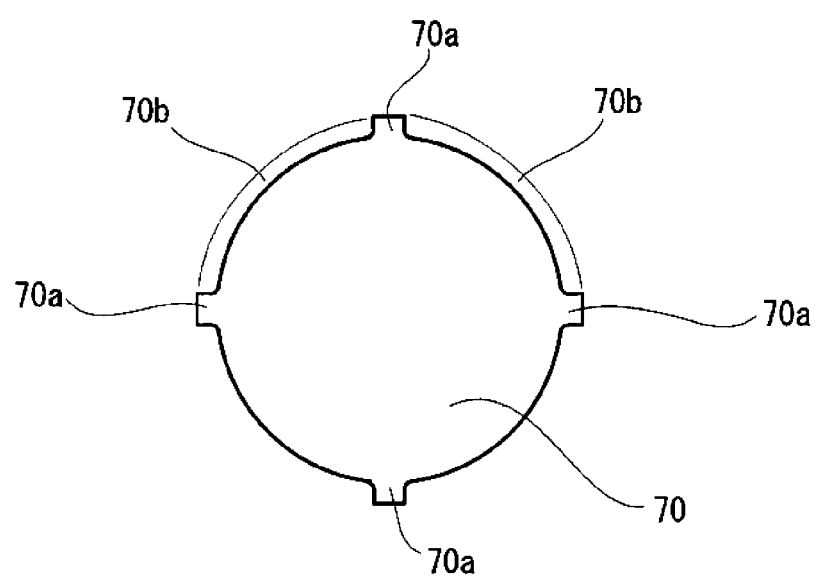
FIG. 3 is a plan view of a baffle disposed at an inlet for a measured medium.

In the diaphragm gauge 1, a baffle 70 made of metal is disposed between the sensor diaphragm 31 of the sensor chip 30 and the introducing portion 10A. Specifically, the baffle 70 is positioned at the inlet for the measured medium from the introducing portion 10A, with a surface thereof being orthogonal to a direction of travel F of the measured medium. FIG. 3 is a plan view of the baffle 70. As illustrated, the baffle 70 has tabs 70a arranged along the outer periphery thereof at predetermined angular intervals. The measured medium passes through gaps 70b between adjacent ones of the tabs 70a and is sent to the sensor diaphragm 31.

An operation of the diaphragm gauge 1 will now be described. Note that in the present embodiment, the diaphragm gauge 1 is installed at an appropriate location in the CVD process in the semiconductor manufacturing apparatus.

(Pressure Measurement of Measured Medium)

In the diaphragm gauge 1, the measured medium (gas) from the introducing portion 10A reaches the sensor diaphragm 31. Then, a difference between the pressure of the measured medium and the pressure in the reference vacuum chamber 34 causes the sensor diaphragm 31 to flex, changes the distance between the movable electrode 38 and the fixed electrode 37 which are disposed between the back surface of the sensor diaphragm 31 and the inner surface of the sensor base 35, and changes the capacitance value (capacitance) of a capacitor formed by the movable electrode 38 and the fixed electrode 37. The pressure of the measured medium is measured by taking the changes in capacitance out of the diaphragm gauge 1.

(Prevention of Contaminant Accumulation Caused by Gas Phase Reaction)

In the measurement of pressure of the measured medium, the measured medium (gas) hits the center of the surface of the baffle 70, changes its direction to pass through the gaps 70b around the baffle 70, and flows through the introducing hole 21a of the first base plate 21 into the slit-like space (cavity) 20A between the first base plate 21 and the second base plate 22.

The measured medium flowing in the slit-like space cavity) 20A is discharged from the discharging hole (pressure introducing hole) 22a in the second base plate 22 and introduced into the pressure introducing chamber 36. Since the pressure introducing chamber 36 has the baffle plate 39 therein, the measured medium hits the baffle plate 39, changes its direction of travel, passes outside the baffle plate 39, and reaches the pressure receiving surface 31a of the sensor diaphragm 31.

The distance L1 between the pressure receiving surface 31a of the sensor diaphragm 31 and the inner surface 36a of the pressure introducing chamber 36 ranges from 10 µm to 50 µm, and the distance L2 between the pressure receiving surface 31a of the censor diaphragm 31 and the surface 39b of the baffle plate 39 ranges from 10 µm to 50 µm and satisfies L2<L1. That is, in the present embodiment, the distance L1 between the pressure receiving surface 31a of the sensor diaphragm 31 and the inner surface 36a of the pressure introducing chamber 36 and the distance L2 between the pressure receiving surface 31a of the sensor diaphragm 31 and the surface 39b of the baffle plate 39 are both smaller than the mean free path λ of the measured medium in the entire region of the pressure receiving surface 31a of the sensor diaphragm 31.

Therefore, in the present embodiment, the flow of the measured medium in a direction orthogonal to the pressure receiving surface 31a of the sensor diaphragm 31 becomes a molecular flow in the entire region of the pressure receiving surface 31a, and collisions between molecules on the pressure receiving surface 31a of the sensor diaphragm 31 are reduced. Therefore, in the case of a gas phase reaction, collisions between different substances are reduced and this reduces accumulation of contaminants on the sensor diaphragm 31. Thus, problems associated with accumulation of contaminants specific to CVD processes can be reduced.

In the structure of the first embodiment, the distance L1 between the pressure receiving surface 31a of the sensor diaphragm 31 and the inner surface 36a of the pressure introducing chamber 36 facing the pressure receiving surface 31a does not necessarily need to satisfy L1<λ. That is, the surface 39b of the baffle plate 39 in the pressure introducing chamber 36 may be expanded in such a manner that only the distance L2 between the pressure receiving surface 31a of the sensor diaphragm 31 and the surface 39b of the baffle plate 39 satisfies L2<λ.

(Second Embodiment)

Figure 4:
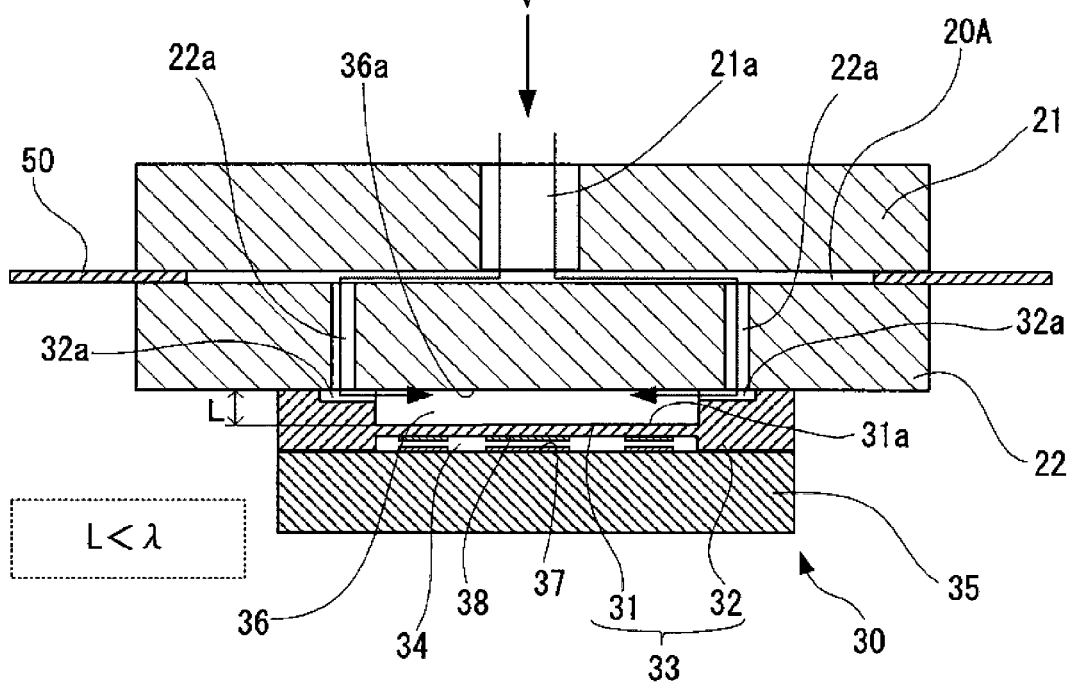
FIG. 4 illustrates a main part of a second embodiment.

Although the pressure introducing chamber 36 is provided with the baffle plate 39 in the first embodiment, the second embodiment does not include the baffle plate 39. FIG. 4 is a vertical cross-sectional view of a main part of the diaphragm gauge 1 corresponding to FIG. 2. Note that the first base plate 21 is additionally shown in FIG. 4.

Figure 5:
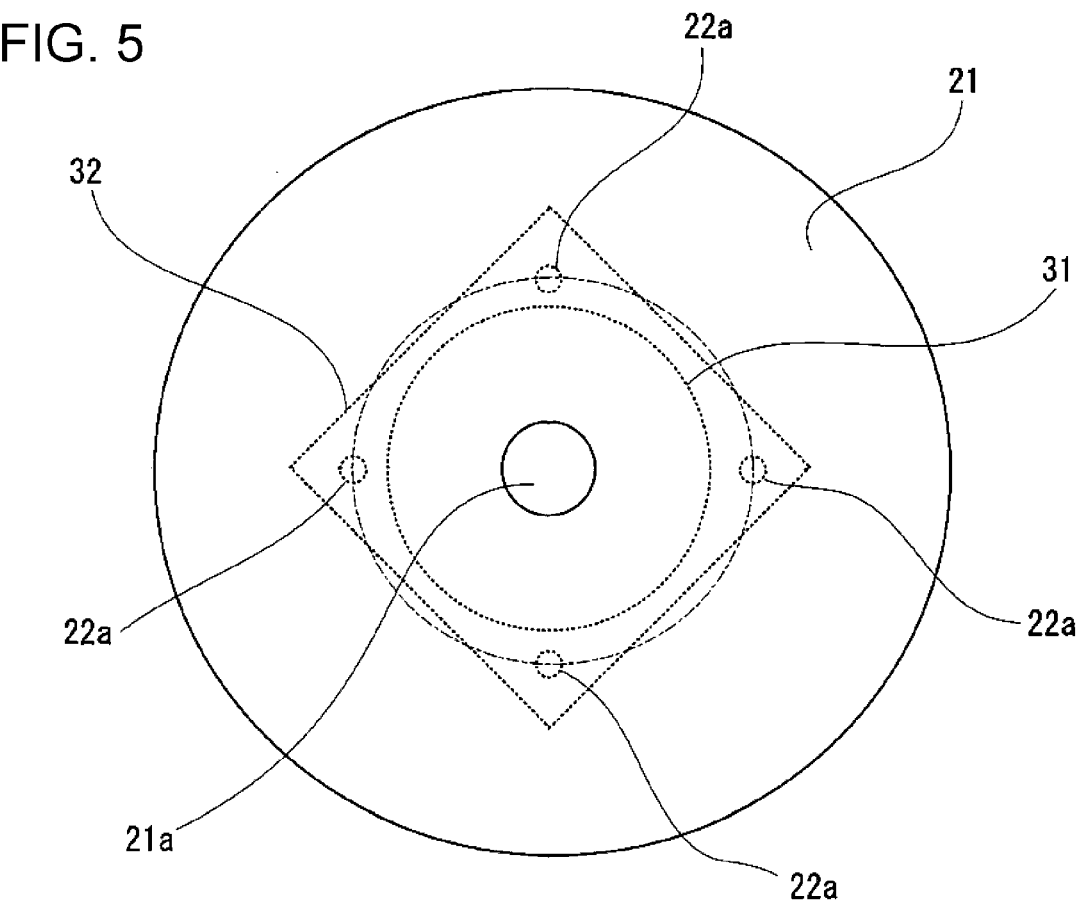
FIG. 5 is a plan view as viewed in the direction of arrow V in FIG. 4.

In the second embodiment, the second base plate 22 has a plurality of (four, in this example) discharging holes 22a for discharging the measured medium. The discharging holes 22a communicate with the slit-like space (cavity) 20A and the pressure introducing chamber 36 in the sensor chip 30. FIG. 5 illustrates a positional relationship between the introducing hole 21a formed in the first base plate 21 and the discharging holes 22a formed in the second base plate 22. FIG. 5 is a plan view as viewed in the direction of arrow V in FIG. 4.

As illustrated in FIGS. 4 and 5, the introducing hole 21a in the first base plate 21 and the discharging holes 22a in the second base plate 22 are arranged so as not to overlap in the direction of thickness of the base plates 21 and 22. In this example, the first base plate 21 has, in the center thereof, one introducing hole 21a for introducing the measured medium, and the second base plate 22 has, at locations away from the center thereof, four discharging holes 22a for discharging the measured medium. That is, the second base plate 22 has four pressure introducing holes 22a for introducing the measured medium into the pressure introducing chamber 36.

Figure 6:
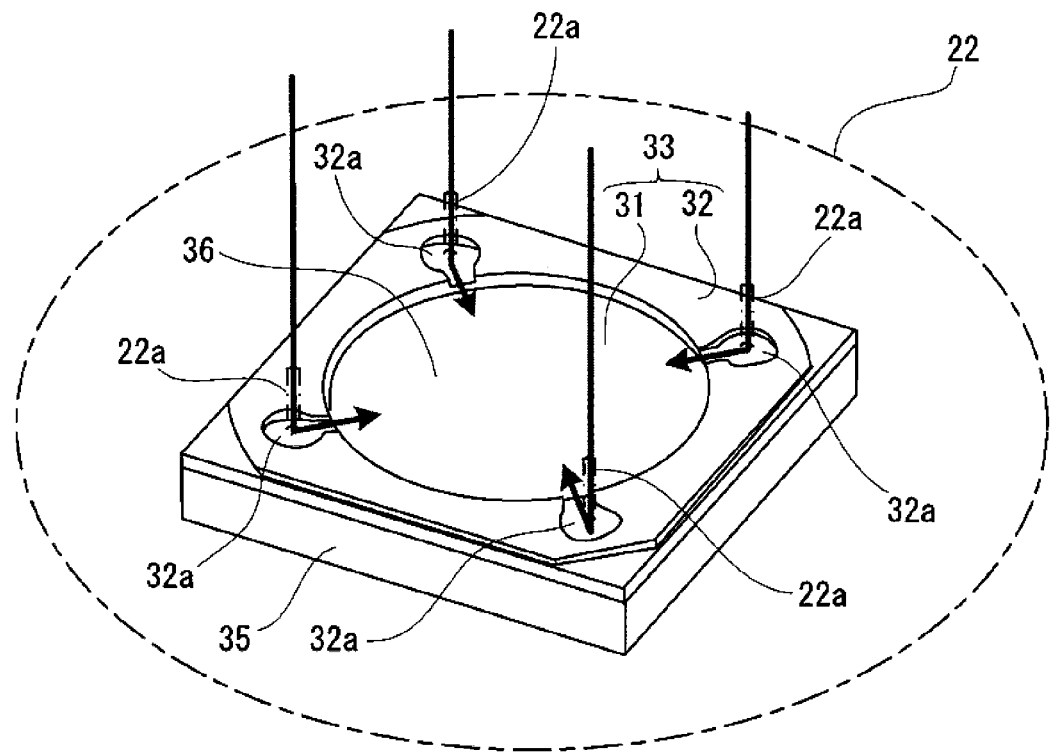
FIG. 6 is a perspective view illustrating locations of pressure introducing holes in a base plate.

The four pressure introducing holes 22a are formed at positions facing the diaphragm support portion 32 in such a manner that they are radially equidistant from the center of the second base plate 22 and circumferentially evenly spaced apart from one another. As illustrated in FIG. 6, the diaphragm support portion 32 has passages 32a directly below the respective pressure introducing holes 22a in the second base plate 22. The passages 32a are configured to allow the pressure introducing holes 22a to communicate with the pressure introducing chamber 36.

In the pressure introducing chamber 36, a distance L between the pressure receiving surface 31a of the sensor diaphragm 31 and the inner surface 36a of the pressure introducing chamber 36 facing the pressure receiving surface 31a is smaller than the mean free path λ of the measured medium in the entire region of the pressure receiving surface 31a of the sensor diaphragm 31 (L<λ). Specifically, the distance L between the pressure receiving surface 31a of the sensor diaphragm 31 and the inner surface 36a of the pressure introducing chamber 36 ranges from 10 µm to 50 µm.

Thus, in the second embodiment, without the baffle plate 39 described in the first embodiment, the flow of the measured medium in the direction orthogonal to the pressure receiving surface 31a of the sensor diaphragm 31 becomes a molecular flow in the entire region of the pressure receiving surface 31a, and collisions between molecules on the pressure receiving surface 31a of the sensor diaphragm 31 are reduced.

(Third Embodiment)

In the second embodiment (i.e., structure illustrated in FIG. 4), there may be cases where, due to constraints in processing the sensor chip 30, the distance L between the pressure receiving surface 31a of the sensor diaphragm 31 and the inner surface 36a of the pressure introducing chamber 36 cannot be made smaller than the mean free path λ of the measured medium.

Figure 7:
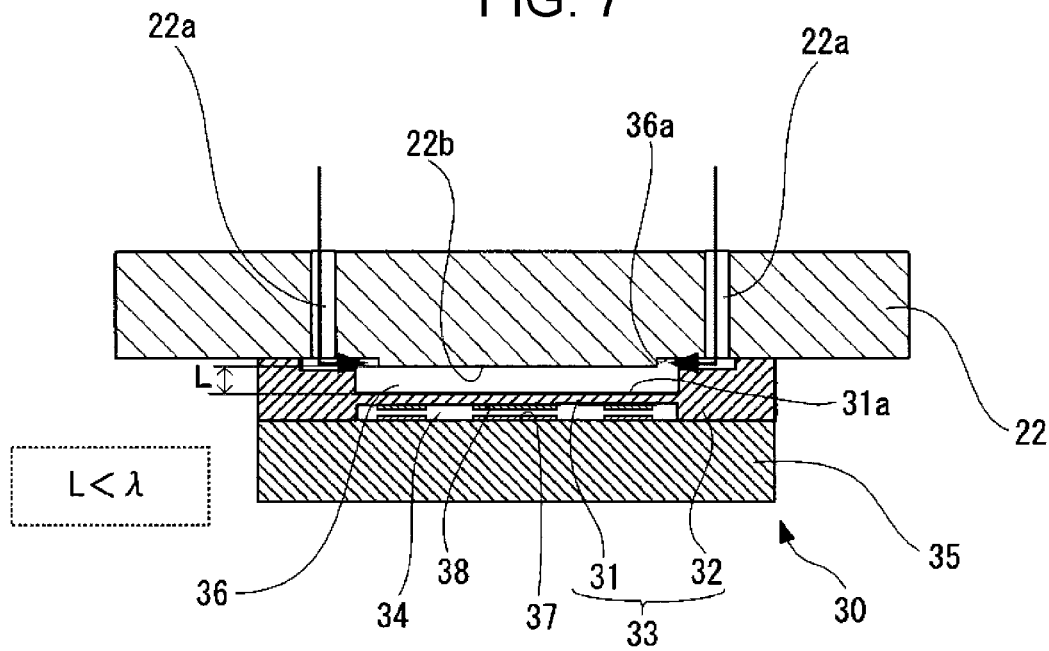
FIG. 7 illustrates a main part of a third embodiment.

In such a case, as illustrated in FIG. 7, the second base plate 22 may be processed in such a manner that substantially the entire surface thereof facing the pressure receiving surface 31a of the sensor diaphragm 31 becomes a raised surface 22b, so that the distance L between the pressure receiving surface 31a of the sensor diaphragm 31 and the raised surface 22b in the pressure introducing chamber 36 is smaller than the mean free path λ of the measured medium.

In this case, the distance between the inner surface 36a of the pressure introducing chamber 36 outside the raised surface 22b and the pressure receiving surface 31a of the sensor diaphragm 31 is larger than the mean free path λ. However, this causes no problems: even if contaminants accumulate on this outer edge portion of the sensor diaphragm 31. This is because this outer edge portion of the sensor diaphragm 31 is not significantly displaced, and occupies only a small part of the entire pressure receiving surface 31a.

Figure 8:
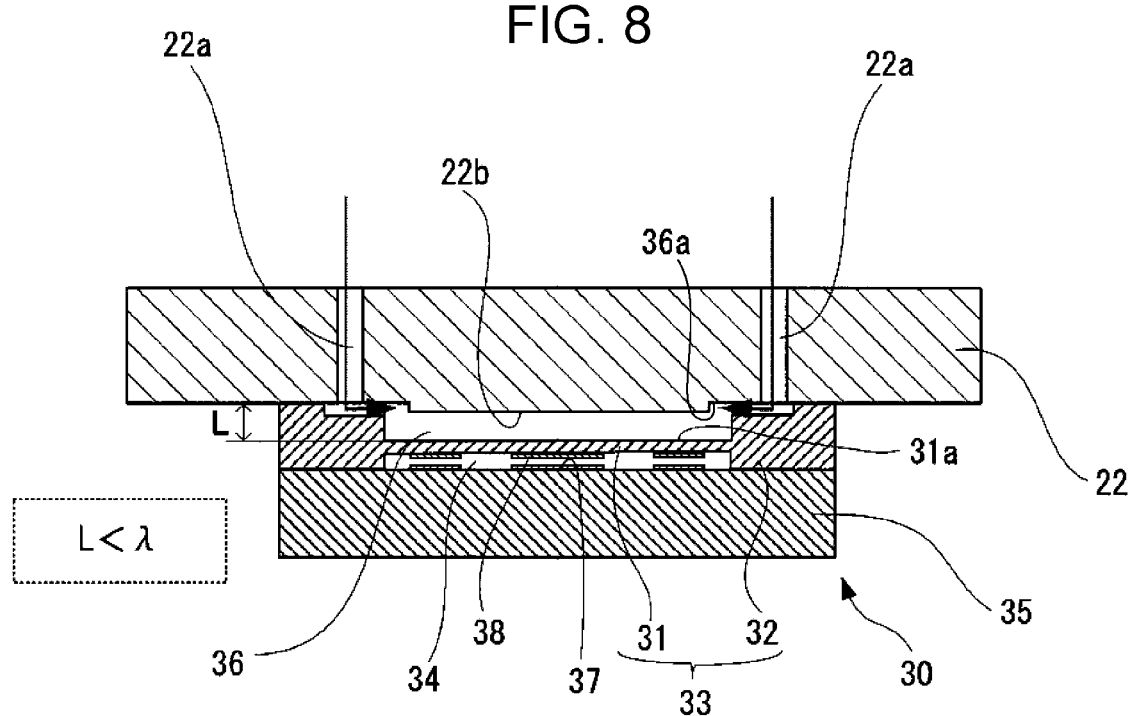
FIG. 8 illustrates a main part of another example of the third embodiment.

In the structure illustrated in FIG. 7, the second base plate 22 has the raised surface 22b to narrow the distance from the pressure receiving surface 31a of the sensor diaphragm 31 on the assumption that there may be where the distance L between the pressure receiving surface 31a of the sensor diaphragm 31 and the inner surface 36a of the pressure introducing chamber 36 cannot be made smaller than the mean free path λ of the measured medium. Alternatively, as illustrated in FIG. 8, even when the distance L between the pressure receiving surface 31a of the sensor diaphragm 31 and the inner surface 36a of the pressure introducing chamber 36 can be made smaller than the mean free path λ of the measured medium, the second base plate 22 may have the raised surface 22b to further narrow the distance from the pressure receiving surface 31a of the sensor diaphragm 31.

(Fourth Embodiment)

In the second embodiment (i.e., structure illustrated in FIG. 4), the flow of the measured medium in a direction orthogonal to the pressure receiving surface 31a of the sensor diaphragm 31 (i.e., perpendicular or vertical direction) is a molecular flow in the entire region of the pressure receiving surface 31a. However, the flow of the measured medium in a direction along the pressure receiving surface 31a of the sensor diaphragm 31 (i.e., parallel or horizontal direction) is not a molecular flow.

Figure 9:
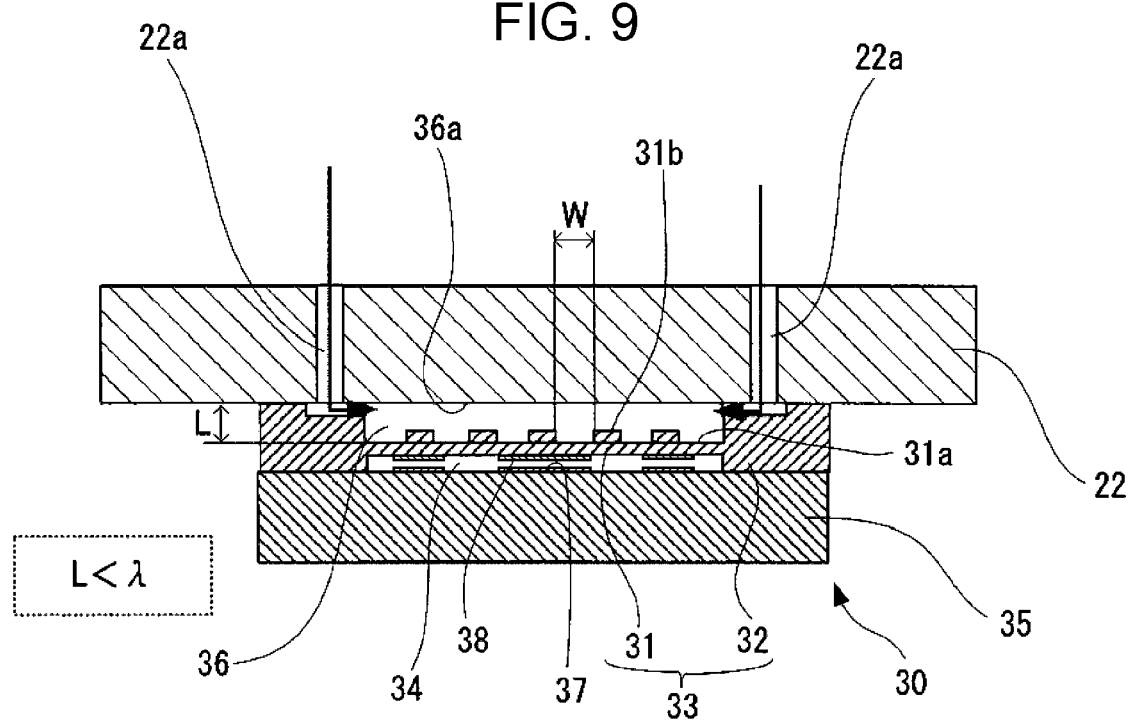
FIG. 9 illustrates a main part of a fourth embodiment.

In the fourth embodiment, as illustrated in FIG. 9, the sensor diaphragm 31 has many raised portions 31b dispersedly arranged on the pressure receiving surface 31a. Thus, the flow of the measured medium becomes a molecular flow not only in the vertical direction but also in the horizontal direction. In this example, a distance W between adjacent ones of the raised portions 31b ranges from 10 μm to 100 μm. When the distance in the vertical direction is set to be narrow, a desired effect can be achieved even if the distance in the horizontal direction is 100 μm, which is slightly long.

Figure 10:
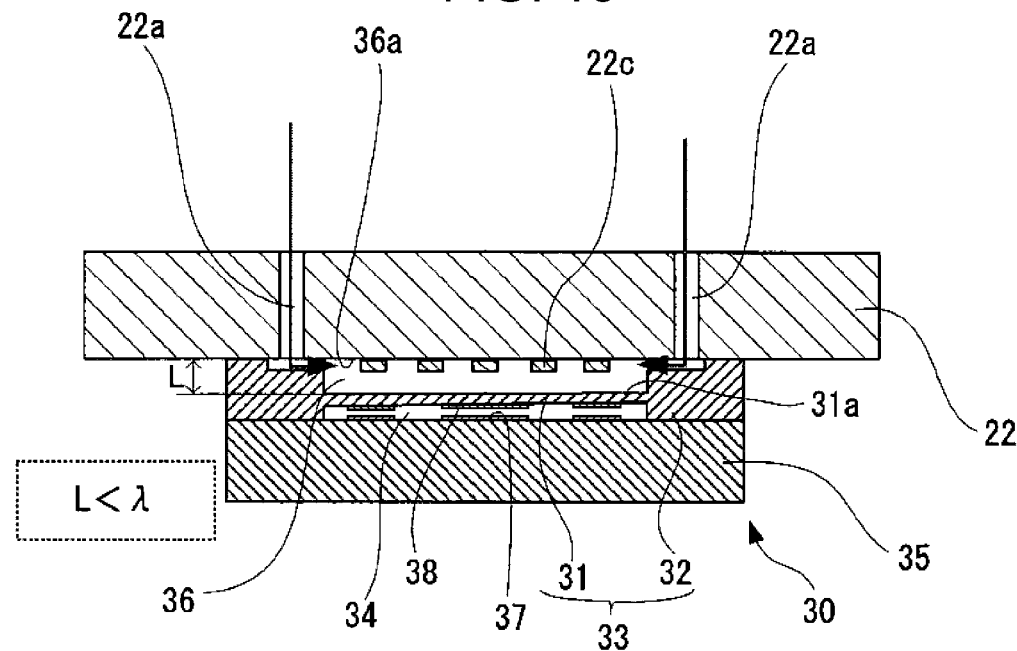
FIG. 10 illustrates a main part of another example of the fourth embodiment.

In the structure illustrated in FIG. 9, the sensor diaphragm 31 has many raised portions 31b dispersedly arranged on the pressure receiving surface 31a. Alternatively, as illustrated in FIG. 10, the second base plate 22 may have many raised portions 22c dispersedly arranged on a surface thereof facing the pressure receiving surface 31a of the sensor diaphragm 31 (i.e., on the inner surface 36a of the pressure introducing chamber 36).

Figure 11:
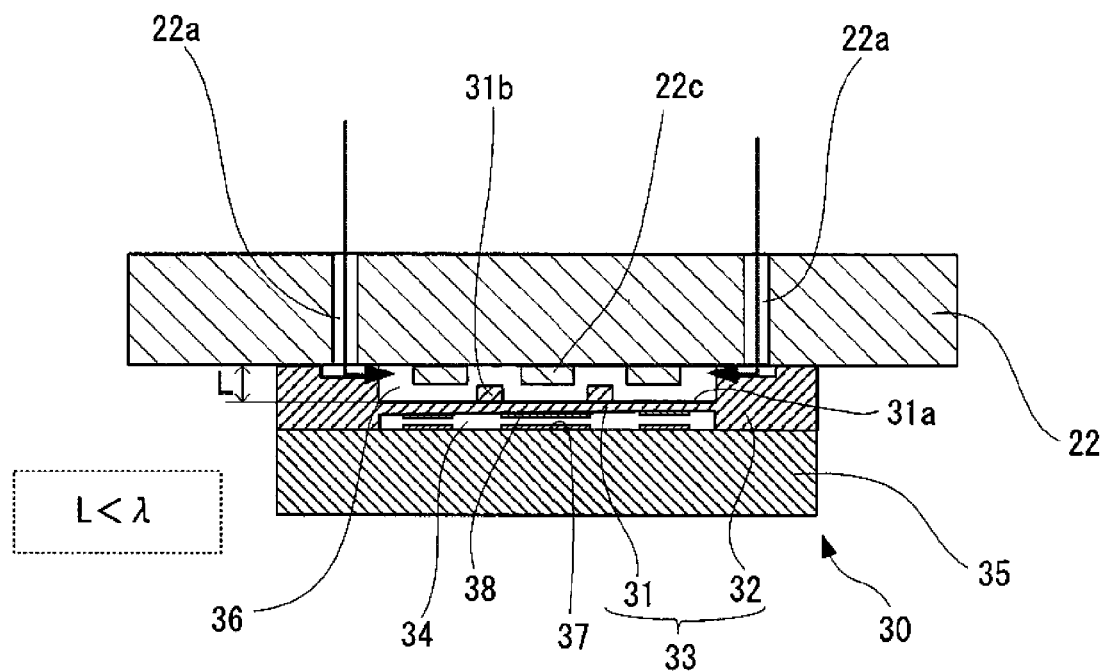
FIG. 11 illustrates a main part of another example of the fourth embodiment.

As illustrated in FIG. 11, the sensor diaphragm 31 may have many raised portions 31b. dispersedly arranged as first raised portions on the pressure receiving surface 31a, and the second base plate 22 may have many raised portions 22c dispersedly arranged as second raised portions on the surface thereof facing the pressure receiving surface 31a of the sensor diaphragm 31 (i.e., on the inner surface 36a of the pressure introducing chamber 36). In this case, the first raised portions 31b and the second raised portions 22c are positioned so as not to overlap each other. This makes a path in the parallel direction in the pressure introducing chamber 36 complex and increases the frequency of collisions of molecules with the wall of the pressure introducing chamber 36.

In the structure illustrated in FIG. 9, the flow of the measured medium in the parallel direction in the space above the raised portions 31b on the sensor diaphragm 31 is not a molecular flow. Also, in the structure illustrated in FIG. 10, the flow of the measured medium in the parallel direction in the space below the raised portions 22c on the second base plate 22 is not a molecular flow. However, in the structure illustrated, in FIG. 11, the flow of the measured medium is a molecular flow in the entire region of the pressure receiving surface 31a of the sensor diaphragm 31.

(Fifth Embodiment)

In the second embodiment structure illustrated in FIG. 4), where the second base plate 22 has the pressure introducing holes 22a at positions facing the diaphragm support portion 32, the baffle plate 39 is removed from the pressure introducing chamber 36.

In the fifth embodiment, as illustrated in FIG. 12, the pressure introducing hole 22a in the center of the second base plate 22 is provided with a turbulence member 80, such as a ceramic filter or metal mesh, which disturbs the flow of the measured medium into the pressure introducing chamber 36.

In the fifth embodiment, the distance L between the pressure receiving surface 31a of the sensor diaphragm 31 and a surface 80a of the turbulence member 80 facing the pressure receiving surface 31a is also smaller than the mean free path λ of the measured medium in the entire region of the pressure receiving surface 31a of the sensor diaphragm 31 (L<λ).

This structure disturbs the flow of the measured medium from the pressure introducing hole 22a, and suppresses the introduction of the measured medium vertically travelling in a straight line into the pressure introducing chamber 36. Thus, in the entire region of the pressure receiving surface 31a of the sensor diaphragm 31, the flow of the measured medium in a direction orthogonal to the pressure receiving Surface 31a becomes a molecular flow, and collisions between molecules on the pressure receiving surface 31a of the sensor diaphragm 31 are reduced.

Although the diameter of the turbulence member 80 is larger than the diameter of the sensor diaphragm 31 in the Structure illustrated in FIG. 12, it may be smaller than the diameter of the sensor diaphragm 31.

In the second through fourth embodiments described above, the second base plate 22 has four pressure introducing holes 22a at position facing the diaphragm support portion 32. However, the number of the pressure introducing holes 22a does not necessarily need to be four, and the second base plate 22 may have only one pressure introducing hole 22a.

(Expansion of Embodiments)

Although the present disclosure has been described with reference to the embodiments, the present disclosure is not limited to the embodiments described above. Various changes which can be understood by those skilled in the art may be made to the configurations and details of the present disclosure, within the scope of the technical idea of the present disclosure.

What is claimed is:

1. A capacitive pressure sensor, comprising:
a diaphragm displaced in response to pressure of a measured medium and a diaphragm support portion configured to support a periphery of the diaphragm;
a sensor base joined to one side of the diaphragm support portion and configured to define a reference vacuum chamber together with the diaphragm;
a base plate joined to the other side of the diaphragm support portion opposite the sensor base and configured to define a pressure introducing chamber together with the diaphragm;
a fixed electrode formed on a surface of the sensor base adjacent to the reference vacuum chamber; and
a movable electrode formed on a surface of the diaphragm adjacent to the reference vacuum chamber in such a manner as to face the fixed electrode,
wherein the base plate has a pressure introducing hole to introduce the measured medium into the pressure introducing chamber; and
the pressure introducing chamber is configured in such a manner that a distance between a pressure receiving surface of the diaphragm and a surface facing the pressure receiving surface is smaller than a mean free path of the measured medium in substantially an entire region of the pressure receiving surface.

2. The capacitive pressure sensor according to claim 1, wherein the base plate has the pressure introducing hole in a center thereof;
the pressure introducing chamber is provided with a baffle plate positioned with one surface thereof facing in a direction orthogonal to a direction of travel of the measured medium introduced through the pressure introducing hole into the pressure introducing chamber; and
a first distance between the pressure receiving surface of the diaphragm and an inner surface of the pressure introducing chamber facing the pressure receiving surface and a second distance between the pressure receiving surface of the diaphragm and the other surface of the baffle plate facing the pressure receiving surface are both smaller than the mean free path of the measured medium in the entire region of the pressure receiving surface of the diaphragm.

3. The capacitive pressure sensor according to claim 1, wherein the base plate has the pressure introducing hole at a position facing the diaphragm support portion; and
the pressure introducing chamber is configured in such a manner that a distance between the pressure receiving surface of the diaphragm and an inner surface of the pressure introducing chamber facing the pressure receiving surface is smaller than the mean free path of the measured medium in the entire region of the pressure receiving surface of the diaphragm.

4. The capacitive pressure sensor according to claim 1, wherein a surface of the base plate facing the pressure receiving surface of the diaphragm is substantially entirely a raised surface; and
the pressure introducing chamber is configured in such a manner that a distance between the pressure receiving surface of the diaphragm and the raised surface of the base plate facing the pressure receiving surface is smaller than the mean free path of the measured medium.

5. The capacitive pressure sensor according to claim 3, wherein a surface of the base plate facing the pressure receiving surface of the diaphragm is substantially entirely a raised surface.

6. The capacitive pressure sensor according to claim 3, wherein the diaphragm has many raised portions dispersedly arranged on the pressure receiving surface thereof.

7. The capacitive pressure sensor according to claim 3, wherein the base plate has a plurality of raised portions dispersedly arranged on a surface thereof facing the pressure receiving surface of the diaphragm.

8. The capacitive pressure sensor according to claim 3, wherein the diaphragm has a plurality of raised portions dispersedly arranged as first raised portions on the pressure receiving surface thereof;
the base plate has a plurality of raised portions dispersedly arranged as second raised portions on a surface thereof facing the pressure receiving surface of the diaphragm; and
the first raised portions and the second raised portions are positioned so as not to overlap each other.

9. The capacitive pressure sensor according to claim 1, wherein the base plate has the pressure introducing hole in a center thereof; and
the pressure introducing hole has a turbulence member therein configured to disturb a flow of the measured medium into the pressure introducing chamber.

10. The capacitive pressure sensor of claim 1, wherein the pressure introducing hole is arranged outside a lateral extent of the diaphragm.

* * * * *

UNITED STATES PATENT AND TRADEMARK OFFICE
CERTIFICATE OF CORRECTION

PATENT NO. : 10,670,481 B2
APPLICATION NO. : 15/896139
DATED : June 2, 2020
INVENTOR(S) : Takuya Ishihara et al.

Page 1 of 1

It is certified that error appears in the above-identified patent and that said Letters Patent is hereby corrected as shown below:

On the Title Page

Item (73), the Assignee's name is incorrect. Item (73) should read:
-- (73) Assignee: AZBIL CORPORATION, Chiyoda-ku (JP) --

Signed and Sealed this
Third Day of November, 2020

Andrei Iancu
*Director of the United States Patent and Trademark Office*